United States Patent
Ribarov et al.

(10) Patent No.: US 9,072,921 B2
(45) Date of Patent: Jul. 7, 2015

(54) THERMODYNAMICALLY-OPTIMIZED ADVANCED FIRE SUPPRESSION SYSTEM

(71) Applicant: Hamilton Sundstrand Corporation, Windsor Locks, CT (US)

(72) Inventors: Lubomir A. Ribarov, West Hartford, CT (US); Adam Chattaway, Berkshire (GB); Dharmendr Len Seebaluck, Wake Forest (CA)

(73) Assignee: Hamilton Sundstrand Corporation, Windsor, CT (US)

( * ) Notice: Subject to any disclaimer, the term of this patent is extended or adjusted under 35 U.S.C. 154(b) by 367 days.

(21) Appl. No.: 13/659,204

(22) Filed: Oct. 24, 2012

(65) Prior Publication Data
US 2014/0110137 A1  Apr. 24, 2014

(51) Int. Cl.
*A62C 3/08* (2006.01)
*A62C 35/02* (2006.01)
*A62C 35/64* (2006.01)
*A62C 99/00* (2010.01)

(52) U.S. Cl.
CPC . *A62C 3/08* (2013.01); *A62C 35/64* (2013.01); *A62C 35/023* (2013.01); *A62C 99/0018* (2013.01)

(58) Field of Classification Search
CPC ........ A62C 3/08; A62C 35/023; A62C 35/64; A62C 99/0018
USPC .................... 169/5, 11, 16, 44, 62
See application file for complete search history.

(56) References Cited

U.S. PATENT DOCUMENTS

| | | | |
|---|---|---|---|
| 5,957,210 A * | 9/1999 | Cohrt et al. | 169/44 |
| 6,601,653 B2 | 8/2003 | Grabow et al. | |
| 6,676,081 B2 * | 1/2004 | Grabow et al. | 244/129.2 |
| 6,935,433 B2 * | 8/2005 | Gupta | 169/46 |
| 7,153,446 B2 | 12/2006 | Grigg | |
| 7,407,598 B2 | 8/2008 | Posson et al. | |
| 7,886,836 B2 | 2/2011 | Haaland et al. | |
| 7,900,709 B2 | 3/2011 | Kotliar | |
| 7,906,034 B2 | 3/2011 | Posson et al. | |
| 2002/0070035 A1* | 6/2002 | Grabow et al. | 169/16 |
| 2003/0051887 A1* | 3/2003 | Cramer | 169/62 |
| 2004/0163826 A1* | 8/2004 | Spring | 169/46 |
| 2010/0236796 A1* | 9/2010 | Chattaway et al. | 169/46 |
| 2011/0308822 A1 | 12/2011 | Seebaluck et al. | |

* cited by examiner

Primary Examiner — Ryan Reis
(74) Attorney, Agent, or Firm — Kinney & Lange, P.A.

(57) ABSTRACT

A fire suppression system for an aircraft includes an air separation module configured to receive exhaust air and ram air, conditioned compressor bleed air, and any combination thereof. The air separation module is also configured to provide nitrogen-enriched air and inert gas. The nitrogen-enriched air flows into a nitrogen-enriched air distribution network for fuel tank inerting. The inert gas flows into an inert gas distribution network for fire suppression in areas of the aircraft other than fuel tanks.

26 Claims, 1 Drawing Sheet

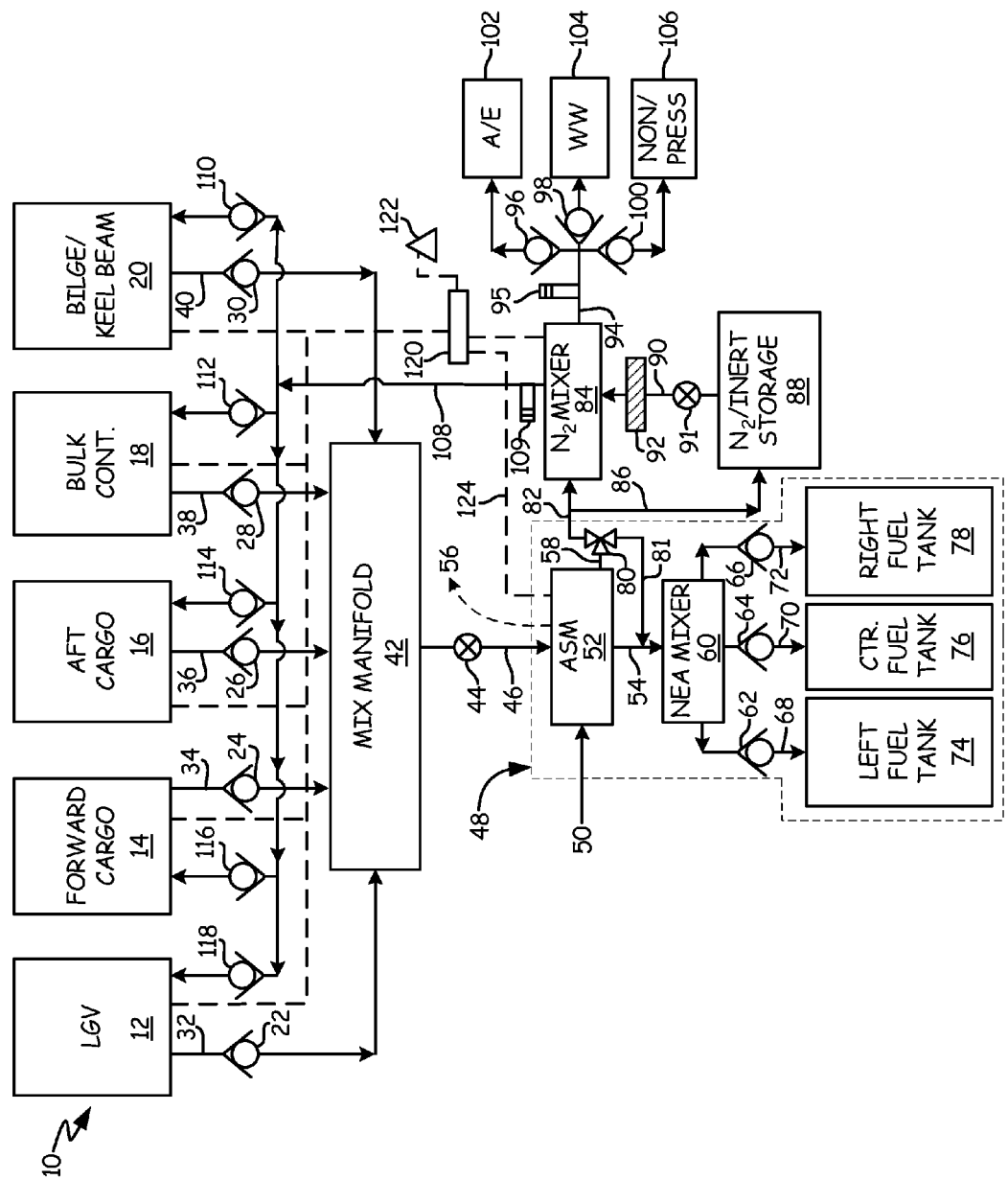

US 9,072,921 B2

THERMODYNAMICALLY-OPTIMIZED ADVANCED FIRE SUPPRESSION SYSTEM

BACKGROUND

The present invention is related to aircraft fire suppression systems, and more specifically a system and method of fire suppression utilizing inert gases.

Currently, some lavatory and galley venting (LGV) systems exhaust air from lavatories, galleys, and optional crew rests to provide ventilation and airplane level smoke management. The exhaust air provides suction to aspirate the cabin and flight deck zone temperature sensors, crest rest zone temperature sensors, and bulk cargo zone temperature sensors. The exhaust air also provides supplemental or backup heat sink capability to remove waste heat from the power electronics cooling system. The exhaust air is subsequently vented overboard. The forward and aft cargo areas and bulk container heating system provides ventilation and heating to the aft cargo and bulk container compartments (AC/BC). The air used for this heating system is typically vented to the lower bilge/keel beam area of an aircraft and subsequently also vented overboard. These systems are thermodynamically inefficient, as work is done to ingest, compress, and condition the LGV and AC/BC air streams, and the excess is vented overboard and not utilized.

Current fuel tank inerting systems require an external air intake, where an air separation module is supplied with ram air or conditioned compressor bleed air in order to produce nitrogen-enriched air for fuel tank inerting. The air separation module is part of a nitrogen generation system, which provides nitrogen-enriched air for fire suppression. However, the ram air inlet causes an increase in aerodynamic skin friction due to the size of the ram air intake opening. Compressor bleed air is an undesirable parasitic loss. Additionally, some systems may require additional nitrogen tanks or bottles for effective fire protection and suppression. To date all cargo bay fire suppression systems use halon-1301, which is an ozone depleting substance. The Montreal Protocol mandated the phase out of halon-1301 for commercial and industrial fire protection. However, no viable options currently exist for commercial fire protection of cargo bays.

SUMMARY

In one embodiment, a fire suppression system for an aircraft includes an air separation module configured to receive exhaust air and ram air, conditioned compressor bleed air, and any combination thereof. The air separation module is also configured to provide nitrogen-enriched air and inert gas. The nitrogen-enriched air flows into a nitrogen-enriched air distribution network for fuel tank inerting. The inert gas flows into an inert gas distribution network for fire suppression in areas of the aircraft other than fuel tanks.

In another embodiment, a fire suppression method for an aircraft includes feeding exhaust air and ram air, conditioned compressor bleed air, and any combination thereof into an air separation module. The air separation module generates nitrogen-enriched air and inert gas. The nitrogen-enriched air is fed from the air separation module into a nitrogen-enriched air distribution network for fuel tank inerting. The inert gas is fed from the inert gas generator into an inert gas distribution network for fire suppression in areas of the aircraft other than fuel tanks.

BRIEF DESCRIPTION OF THE DRAWINGS

FIG. 1 is a schematic diagram of the fire suppression system.

DETAILED DESCRIPTION

The present invention provides a system and method of fire suppression for aircraft cargo areas, dry bays, and other areas requiring fire protection. In particular, the nitrogen generation system of the present invention utilizes exhaust air from pressurized areas of the fuselage in addition to intake air and is integrated with inert gas-based fire suppression for non-pressurized and pressurized areas of the fuselage. Therefore, the present invention increases the thermodynamic efficiency of the aircraft.

FIG. 1 is a schematic diagram of fire suppression system 10 according to an embodiment of the invention. Fire suppression system 10 includes lavatory and galley venting (LGV) system 12, forward cargo area 14, aft cargo area 16, bulk container 18, and bilge/keel beam area 20. Fire suppression system 10 also includes exhaust air check valves 22, 24, 26, 28, and 30, which allow the flow of exhaust air through exhaust air lines 32, 34, 36, 38, and 40, respectively, into mix manifold 42. Flow valve 44 controls the flow of exhaust air from mix manifold 42 to exhaust air input 46 of nitrogen generation system (NGS) 48.

NGS 48 of fire suppression system 10 provides nitrogen-enriched air for fuel tank inerting. NGS 48 also includes exhaust air input 46, intake air input 50, air separation module (ASM) 52, nitrogen-enriched air (NEA) line 54, air overboard line 56, nitrogen ($N_2$)/inert gas line 58, NEA mixer 60, check valves 62, 64, and 66, NEA lines 68, 70, and 72, left fuel tank 74, center fuel tank 76, right fuel tank 78, and three way flow valve 80.

Intake air flows through intake air input 50 and into ASM 52. In one embodiment, intake air may be ram air. In another embodiment, intake air may be conditioned compressor bleed air. In an alternative embodiment, intake air may include both ram air and conditioned compressor bleed air. Exhaust air flows through exhaust air input 46 and into ASM 52. NEA, overboard air, and $N_2$/inert gas flow out of ASM 52 and into NEA line 54, air overboard line 56, and $N_2$/inert gas line 58, respectively. NEA flows through NEA line 54 into NEA mixer 60 of NGS 48. Check valves 62, 64, and 66 allow the flow of nitrogen-enriched air through NEA lines 68, 70, and 72 into left fuel tank 74, center fuel tank 76, and right fuel tank 78, respectively. $N_2$/inert gas from ASM 52 flows through $N_2$/inert gas line 58 and into three way flow valve 80. $N_2$/inert gas flows through three way flow valve 80 and may flow into $N_2$/inert gas line 81 or $N_2$/inert gas line 82.

Fire suppression system 10 supplies NEA or $N_2$/inert gas to all areas of the aircraft such as left fuel tank 74, center fuel tank 76, and right fuel tank 78, LGV system 12, forward cargo area 14, aft cargo area 16, bulk container 18, and bilge/keel beam area 20. To provide $N_2$/inert gas fire suppression, fire suppression system 10 includes nitrogen mixer 84, $N_2$/inert gas line 86, $N_2$/inert storage 88, $N_2$/inert gas line 90, flow valve 91, flow regulator 92, mixer outlet line 94, pressure relief valve 95, check valves 96, 98, and 100, avionics/electronics (A/E) system 102, wheel wells (WW) 104, non-pressurized area 106, mixer outlet line 108, pressure relief valve 109, check valves 110, 112, 114, 116, and 118, flow controller 120, sensor/warning system 122, and sensor network 124.

$N_2$/inert gas from $N_2$/inert gas line 82 either flows into nitrogen mixer 84 or through $N_2$/inert gas line 86 into $N_2$/inert gas storage 88. $N_2$/inert gas flows from $N_2$/inert gas storage 88 through $N_2$/inert line 90, through flow valve 91, through flow regulator 92 and into nitrogen mixer 84. $N_2$/inert gas flows from nitrogen mixer 84 into mixer outlet lines 94 and 108. Check valves 96, 98, and 100 allow the flow of $N_2$/inert gas through mixer outlet line 94 and through pressure relief valve 95 into A/E system 102, WW 104, and non-pressurized area 106, respectively. Check valves 110, 112, 114, 116, and 118 allow the flow of $N_2$/inert gas through mixer outlet line 108 and through pressure relief valve 109 into bilge/keel beam area 20, bulk container 18, aft cargo area 16, forward cargo area 14, and LGV system 12, respectively.

LGV system 12, forward cargo area 14, aft cargo area 16, bulk container 18, and bilge/keel beam area 20 produce exhaust air, which is directed into exhaust air lines 32, 34, 36, 38, and 40, respectively. Exhaust air flows through exhaust air lines 32, 34, 36, 38, and 40, through exhaust air check valves 22, 24, 26, 28, and 30, respectively, and into mix manifold 42 for mixing and pressure modulation control. Exhaust air check valves 22, 24, 26, 28, and 30 can be closed selectively if fire is detected in LGV system 12, forward cargo area 14, aft cargo area 16, bulk container 18, or bilge/keel beam area, respectively. NGS 48 receives exhaust air from exhaust air input 46 in addition to intake air from intake air input 50. Thus, instead of venting overboard the exhaust air from LGV system 12, forward cargo area 14, aft cargo area 16, bulk container 18, and bilge/keel beam area 20, the thermal energy of exhaust air from LGV system 12, forward cargo area 14, aft cargo area 16, bulk container 18, and bilge/keel beam area 20 is further utilized, resulting in an increased overall thermodynamic efficiency of the aircraft.

In one embodiment, flow valve 44 is a metering/proportioning valve that monitors the overall need for NEA, optimizing the flow of exhaust air through exhaust air input 46 and intake air through intake air input 50 into ASM 52. In another embodiment, mix manifold 42 is equipped with flow sensors and pressure sensors that assist in modulating flow of intake air through intake air input 50 into ASM 52 based on how much exhaust air is available from LGV system 12, forward cargo area 14, aft cargo area 16, bulk container 18, and bilge/keel beam area 20.

Utilization of exhaust air from exhaust air lines 32, 34, 36, 38, and 40 for NGS 48 decreases the need for intake air fed from intake air input 50 for NGS 48. This allows for a smaller diameter for the ram air inlet of intake air input 50, which reduces the cross sectional area of the ram air inlet, therefore reducing associated aerodynamic aircraft skin friction losses. Additionally, feeding both exhaust air through exhaust air input 46 and intake air through intake air input 50 into ASM 52 of NGS 48 allows NGS 48 to be smaller and more compact.

Fire suppression system 10 integrates NGS 48 with inert gas-based fire suppression for non-pressurized and pressurized areas of an aircraft. ASM 52 removes oxygen from exhaust air input 46 and intake air input 50. ASM 52 generates NEA, which flows into NEA line 54 and inert gas, which flows into $N_2$/inert gas line 58. Oxygen removed in ASM 52 is vented overboard through air overboard line 56. Any excess air not utilized by NGS 48 is also vented overboard through air overboard line 56.

$N_2$/inert gas flows from ASM 52 into $N_2$/inert gas line 58 and subsequently flows into three way flow valve 80. Sensor/warning system 122 and sensor network 124 alerts ASM 52 as to whether inert gas is necessary for inert gas-based fire suppression in non-pressurized and pressurized areas of the fuselage. In one embodiment, if fire suppression is immediately necessary, inert gas flows into $N_2$/inert gas line 58, through three way flow valve 80, through $N_2$/inert gas line 82 and into nitrogen mixer 84. Mixer outlet lines 94 and 108 subsequently deliver $N_2$/inert gas for fire suppression to any non-pressurized or pressurized area of the fuselage requiring fire suppression.

In one embodiment, $N_2$/inert gas in mixer outlet lines 94 and 108 contains 99% nitrogen and 1% other inert gases selected from the group consisting of helium, neon, argon, krypton, xenon, radon, and any combination thereof. Inert gas is environmentally benign, and thus advantageous for fire suppression in non-pressurized and pressurized areas of the fuselage. In contrast, ozone depleting substances such as halon are effective for fire suppression but release acidic decomposition product gases into the environment when used for fire fighting.

Flow controller 120, sensor/warning system 122, and sensor network 124 control the flow of $N_2$/inert gas through mixer outlet lines 94 and 108 into non-pressurized and pressurized areas of the fuselage requiring fire suppression. Check valves 96, 98, and 100 allow the $N_2$/inert gas in mixer outlet line 94 to flow only into A/E system 102, WW 104, and non-pressurized area 106 respectively. Check valves 96, 98, and 100 stop any flow out of A/E system 102, WW 104, and non-pressurized area 106, respectively, such that any fire does not spread to the rest of the fuselage. Check valves 110, 112, 114, 116, and 118 allow $N_2$/inert gas in mixer outlet line 108 to flow only into bilge/keel beam area 20, bulk container 18, aft cargo area 16, forward cargo area 14, and LGV system 12, respectively. Check valves 110, 112, 114, 116, and 118 stop any flow out of bilge/keel beam area 20, bulk container 18, aft cargo area 16, forward cargo area 14, and LGV system 12, respectively, such that any fire does not spread to the rest of the fuselage.

In another embodiment, if fire suppression is not immediately necessary, mixer outlet lines 94 and 108 are filled such that they are primed for fire suppression when it becomes necessary. Pressure relief valves 95 and 109 prevent overpriming of mixer outlet lines 94 and 108. In another embodiment, if both mixer outlet line 94 and mixer outlet line 108 are filled with $N_2$/inert gas, $N_2$/inert gas flows from $N_2$/inert gas line 82, through $N_2$/inert gas line 86, and into $N_2$/inert storage 88. $N_2$/inert storage 88 may contain other fire suppressing agents such as Novec-1230, HFC-125, 2-BTP, HFC-236fa, HFC-227ea, and Halon-1301. $N_2$/inert gas flows from $N_2$/inert storage 88, into $N_2$/inert gas line 90, through flow valve 91, through flow regulator 92 and into nitrogen mixer 84. Flow valve 91 is a fail-safe "open" valve. If flow valve 91 is unable to actuate the flow of $N_2$/inert gas from $N_2$/inert storage 88, flow valve 91 will remain open, allowing $N_2$/inert gas to flow through $N_2$/inert gas line 90 to be distributed for fire suppression. Inert gas from $N_2$/inert gas lines 82 and 90 are subsequently mixed in nitrogen mixer 84 and distributed for fire suppression through mixer outlet lines 94 and 108. In another embodiment, if fire suppression is not immediately necessary, mixer outlet lines 94 and 108 are filled with $N_2$/inert gas, and $N_2$/inert storage 88 is also filled with $N_2$/inert gas, $N_2$/inert gas flows through $N_2$/inert gas line 58, through three way flow valve 80, through $N_2$/inert gas line 81 and merges into NEA line 54.

In one embodiment, NEA flows from ASM 52, through NEA line 54, into NEA mixer 60 and is subsequently mixed. In another embodiment, NEA and $N_2$/inert gas from $N_2$/inert gas line 81 flow through NEA line 54, into NEA mixer 60, and are subsequently mixed. Check valves 62, 64, and 66 allow the flow of NEA through NEA lines 68, 70, and 72 into left fuel tank 74, center fuel tank 76, and right fuel tank 78, respectively. Check valves 62, 64, and 66 stop any flow out of left fuel tank 74, center fuel tank 76, and right fuel tank 78, respectively, such that any fire does not spread. In one embodiment, NEA in NEA lines 68, 70, and 72 contains less than 11% oxygen, and in another embodiment, NEA in NEA lines 68, 70, and 72 contains less than 8% oxygen. NEA provides an inert environment, which prevents fuel tank flammability accidents.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fire suppression system for an aircraft comprising:
   an air separation module configured to receive exhaust air and intake air and configured to provide nitrogen-enriched air and inert gas;
   a nitrogen-enriched air distribution network into which the nitrogen-enriched air flows for fuel tank inerting; and
   an inert gas distribution network into which the inert gas flows for fire suppression in areas of the aircraft other than fuel tanks.

2. The fire suppression system of claim 1, wherein the intake air comprises ram air, conditioned compressor bleed air, or a combination thereof.

3. The fire suppression system of claim 1, wherein the inert gas distribution network includes a storage tank for storing the inert gas when fire suppression is not immediately necessary.

4. The fire suppression system of claim 3, wherein the inert gas distribution network further includes a flow regulator for regulating flow of the inert gas from the storage tank and into a mixer to be distributed when fire suppression becomes necessary.

5. The fire suppression system of claim 1, wherein the nitrogen-enriched air comprises less than 11% oxygen.

6. The fire suppression system of claim 1, wherein the nitrogen-enriched air comprises less than 8% oxygen.

7. The fire suppression system of claim 1, wherein the inert gas includes nitrogen and trace amounts of at least one gas selected from the group consisting of helium, neon, argon, krypton, and xenon.

8. The fire suppression system of claim 1, wherein the air separation module receives the exhaust air from at least one of a lavatory and galley ventilation system, a forward cargo area, an aft cargo area, a bulk container, a bilge/keel beam area, or any combination thereof.

9. The fire suppression system of claim 1, wherein the nitrogen-enriched air distribution system is configured to provide fuel tank inerting to a left fuel tank, a center fuel tank, and a right fuel tank.

10. The fire suppression system of claim 1, wherein the inert gas distribution network is configured to provide fire suppression for at least one of avionics, electronics, wheel wells for landing gear, and any additional non-pressurized fuselage area in need of fire suppression.

11. The fire suppression system of claim 1, wherein the inert gas distribution network is configured to provide fire suppression for at least one of a lavatory and galley ventilation system, a forward cargo area, an aft cargo area, a bulk container, and a pressurized bilge/keel beam area.

12. The fire suppression system of claim 1, wherein the air separation module is further configured to provide unwanted gas to an air overboard line, wherein the unwanted gas includes oxygen.

13. The fire suppression system of claim 1, wherein the inert gas flow distribution network comprises a flow valve configured to receive the inert gas and direct the inert gas through the inert gas distribution network and direct the inert gas to merge with the nitrogen-enriched air and flow into the nitrogen-enriched air distribution network.

14. A method of fire suppression for an aircraft, the method comprising:
   feeding exhaust air and intake air into an air separation module;
   generating nitrogen-enriched air and inert gas in the air separation module;
   feeding the nitrogen-enriched air from the air separation module into a nitrogen-enriched air distribution network for fuel tank inerting; and
   feeding the inert gas from the air separation module into an inert gas distribution network for fire suppression in areas of the aircraft other than fuel tanks.

15. The method of fire suppression of claim 14, wherein the intake air comprises ram air, conditioned compressor bleed air, or a combination thereof.

16. The method of fire suppression of claim 14, further comprising providing unwanted gas that includes oxygen from the air separation module to an air overboard line.

17. The method of fire suppression of claim 14, further comprising flowing the inert gas through a flow valve in the inert gas distribution network, the flow valve configured to receive the inert gas and direct the inert gas through the inert gas distribution network and direct the inert gas to merge with the nitrogen-enriched air and flow into the nitrogen-enriched air distribution network.

18. The method of fire suppression of claim 14, wherein the inert gas distribution network directs the inert gas to provide fire suppression for at least one of avionics, electronics, wheel wells for landing gear, and any additional non-pressurized fuselage area in need of fire suppression.

19. The method of fire suppression of claim 14, wherein the inert gas distribution network directs the inert gas to provide fire suppression for at least one of a lavatory and galley ventilation system, a forward cargo area, an aft cargo area, a bulk container, and a pressurized bilge/keel beam area.

20. The method of fire suppression of claim 14, wherein the inert gas flows through a mixer in the inert gas distribution network to provide immediate fire suppression.

21. The method of fire suppression of claim 20, wherein the inert gas output flows to a storage tank if fire suppression is not immediately necessary.

22. The method of fire suppression of claim 21, wherein a flow regulator in the inert gas distribution network regulates flow of the inert gas from the storage tank and into the mixer to be distributed when fire suppression becomes necessary.

23. The method of fire suppression of claim 14, wherein the exhaust air is received from at least one of a lavatory and galley ventilation system, a forward cargo area, an aft cargo area, a bulk container, a pressurized bilge/keel beam area, or any combination thereof.

24. The method of fire suppression of claim 14, wherein the nitrogen-enriched air comprises less than 11% oxygen.

25. The method of fire suppression of claim 14, wherein the nitrogen-enriched air comprises less than 8% oxygen.

26. The method of fire suppression of claim 14, wherein the inert gas includes nitrogen and trace amounts of at least one gas selected from the group consisting of helium, neon, argon, krypton, and xenon.

* * * * *